US012606106B2

(12) United States Patent
Kikuchi et al.

(10) Patent No.: US 12,606,106 B2
(45) Date of Patent: Apr. 21, 2026

(54) ELECTRONIC COMPONENT UNIT AND WIRE HARNESS

(71) Applicant: YAZAKI CORPORATION, Tokyo (JP)

(72) Inventors: Hideaki Kikuchi, Susono (JP); Hiroyuki Ogura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/827,658

(22) Filed: Sep. 6, 2024

(65) Prior Publication Data

US 2025/0083620 A1 Mar. 13, 2025

(30) Foreign Application Priority Data

Sep. 13, 2023 (JP) ................................. 2023-148046

(51) Int. Cl.
*B60R 16/02* (2006.01)
*B60R 16/033* (2006.01)

(52) U.S. Cl.
CPC ........ *B60R 16/0207* (2013.01); *B60R 16/033* (2013.01)

(58) Field of Classification Search
CPC .............. B60R 16/0207; B60R 16/033; B60R 16/0238; B60R 16/0239; B60R 16/03; H02J 7/00304; H02J 2207/20; H02J 2310/48; H02J 1/082; H02J 7/1423
See application file for complete search history.

(56) References Cited

U.S. PATENT DOCUMENTS

| | | | |
|---|---|---|---|
| 6,775,119 B2 | 8/2004 | Tamai et al. | |
| 10,889,203 B2 | 1/2021 | Vanerhav et al. | |
| 2001/0035685 A1* | 11/2001 | Tamai | H02J 7/1423 |
| | | | 307/10.1 |
| 2002/0190690 A1* | 12/2002 | Tamai | B60L 1/00 |
| | | | 903/903 |
| 2003/0032308 A1 | 2/2003 | Tamai et al. | |
| 2005/0230160 A1* | 10/2005 | Watanabe | H02J 1/08 |
| | | | 180/65.24 |
| 2016/0347184 A1 | 12/2016 | Kikuchi | |
| 2018/0370465 A1* | 12/2018 | Sato | B60R 16/033 |
| 2019/0291601 A1 | 9/2019 | Vanerhav et al. | |

FOREIGN PATENT DOCUMENTS

| | | |
|---|---|---|
| DE | 102011075091 A1 | 11/2012 |
| JP | 2016-222085 A | 12/2016 |
| JP | 2018-52229 A | 4/2018 |

* cited by examiner

*Primary Examiner* — Lincoln D Donovan
*Assistant Examiner* — Alex W Lam
(74) *Attorney, Agent, or Firm* — KENEALY VAIDYA LLP

(57) ABSTRACT

An electronic component unit applied to a wire harness includes a power supply terminal connected to a power supply that is mounted on a vehicle and is capable of supplying power at a first voltage, a circuit branch portion that is connected to the power supply terminal to branch power supplied from the power supply into a plurality of power supply systems, and a voltage converter that is provided in at least one of the plurality of power supply systems in the circuit branch portion, and converts a voltage of the power supplied from the power supply into a second voltage lower than the first voltage to output the second voltage.

4 Claims, 9 Drawing Sheets

ELECTRONIC COMPONENT UNIT AND WIRE HARNESS

CROSS-REFERENCE TO RELATED APPLICATION(S)

The present application claims priority to and incorporates by reference the entire contents of Japanese Patent Application No. 2023-148046 filed in Japan on Sep. 13, 2023.

BACKGROUND OF THE INVENTION

1. Field of the Invention

The present invention relates to an electronic component unit and a wire harness.

2. Description of the Related Art

For example, Japanese Patent Application Laid-open No. 2016-222085 discloses a wire harness for supplying power to various devices installed in a vehicle. The wire harness includes a power supply wire connected to a single vehicle battery that outputs a predetermined first battery voltage, a power supply control box that receives the first battery voltage via the power supply wire, supplies the received first battery voltage to a first device operating at the first battery voltage, steps down the received first battery voltage to set a second battery voltage lower than the first battery voltage, and supplies the second battery voltage to a second device operating at the second battery voltage, a first supply wire that is provided between the power supply control box and the first device to supply the first battery voltage to the first device, and a second supply wire that is provided between the power supply control box and the second device to supply the second battery voltage to the second device.

Meanwhile, the wire harness achieves power supply to each device under a situation where devices with different operating voltages are mixed by integrating, into the power supply control box, a voltage conversion function in addition to fuses, relays, branches, and the like. However, the wire harness has room for further improvement in terms of arrangement of the voltage conversion function and so on, for example.

SUMMARY OF THE INVENTION

The present invention has been made in view of the above circumstances, and an object of the present invention is to provide an electronic component unit and a wire harness capable of appropriately supplying power to various devices mounted on a vehicle.

In order to achieve the above mentioned object, an electronic component unit according to one aspect of the present invention includes a power supply terminal connected to a power supply that is mounted on a vehicle and is capable of supplying power at a first voltage; a circuit branch portion that is connected to the power supply terminal to branch power supplied from the power supply into a plurality of power supply systems; and a voltage converter that is provided in at least one of the plurality of power supply systems in the circuit branch portion, and converts a voltage of the power supplied from the power supply into a second voltage lower than the first voltage to output the second voltage.

In order to achieve the above mentioned object, a wire harness according to another aspect of the present invention includes an electronic component unit provided in a power supply that is mounted on a vehicle and is capable of supplying power at a first voltage; and a power supply wire that supplies power from the electronic component unit to a device mounted on the vehicle, wherein the electronic component unit includes: a power supply terminal connected to the power supply, a circuit branch portion that is connected to the power supply terminal to branch power supplied from the power supply into a plurality of power supply systems, and a voltage converter that is provided in at least one of the plurality of power supply systems in the circuit branch portion, and converts a voltage of the power supplied from the power supply into a second voltage lower than the first voltage to output the second voltage.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited to the embodiment. In addition, constituent elements in the following embodiment include those that can be easily replaced by those skilled in the art or those that are substantially the same.

Embodiment

Figure 1:
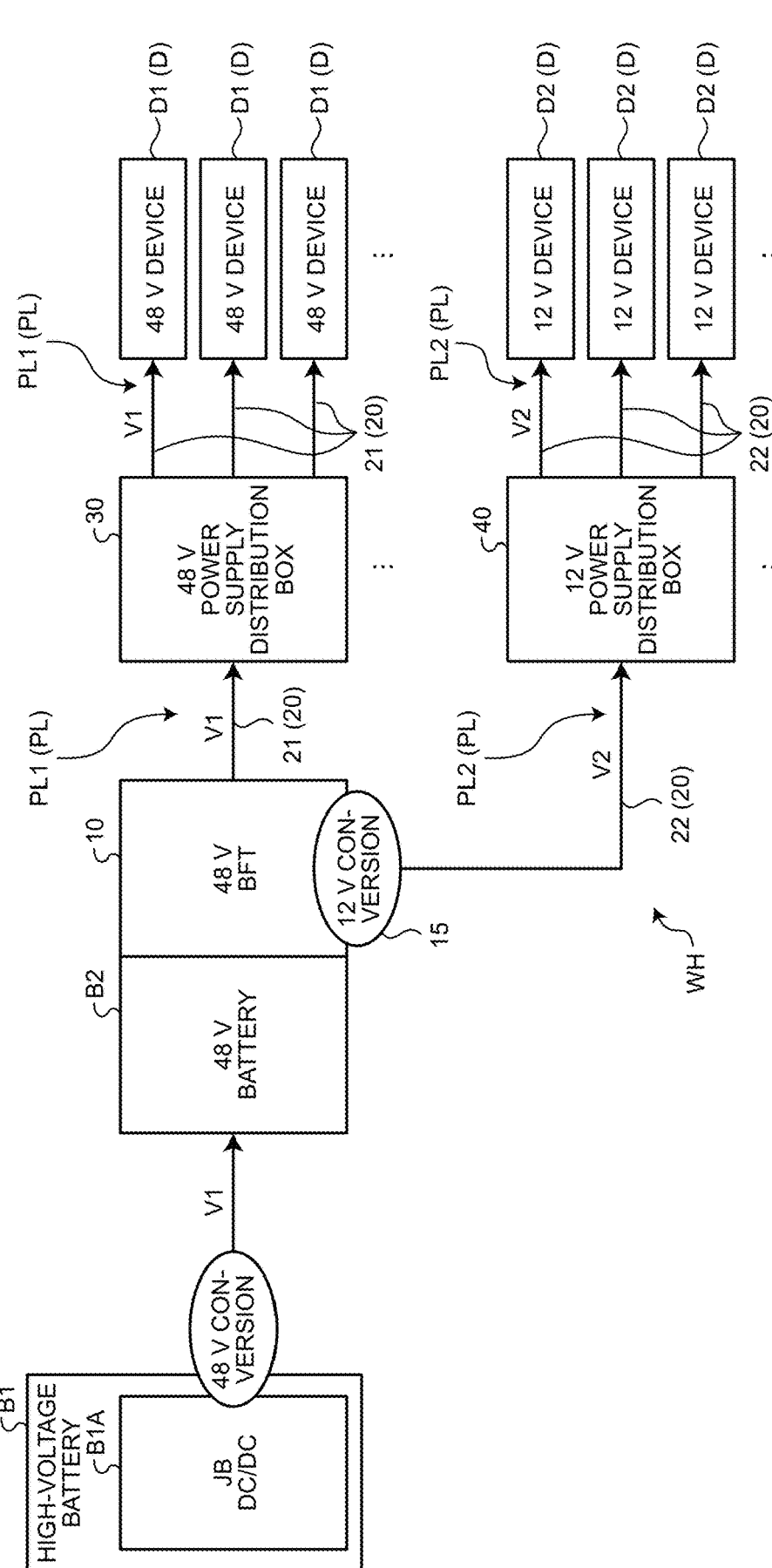
FIG. 1 is a schematic block diagram illustrating a schematic configuration of a power supply system to which a wire harness according to an embodiment is applied.
Figure 2:
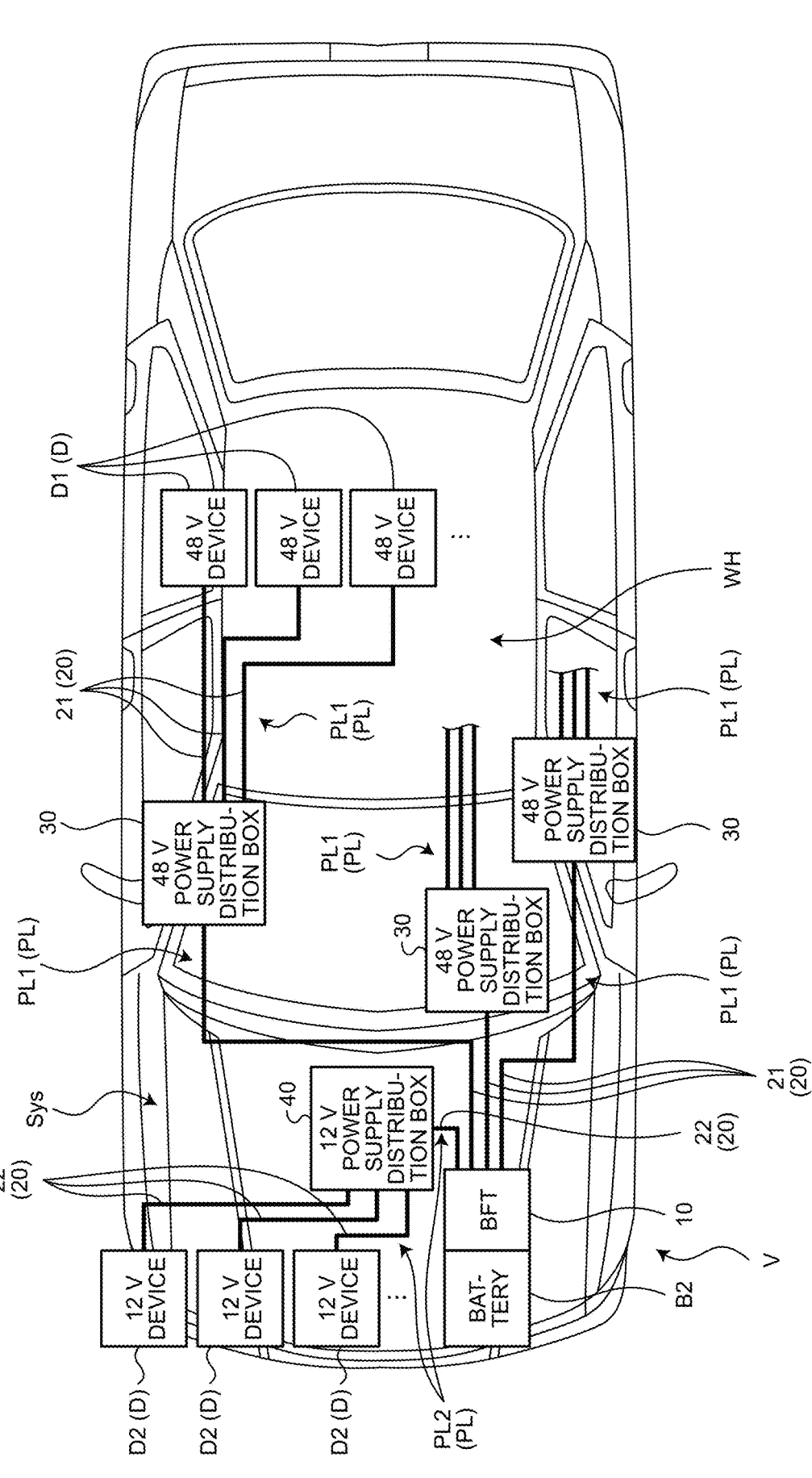
FIG. 2 is a schematic block diagram illustrating a schematic configuration of a vehicle to which the wire harness according to the embodiment is applied.

A wire harness WH according to the present embodiment illustrated in FIGS. 1 and 2 is applied to a power supply system Sys mounted on a vehicle V. The power supply system Sys is a system that supplies power to various devices D mounted on the vehicle V. The devices D are load devices that operate and are driven by power supplied from the power supply system Sys to exhibit various functions in the vehicle V. Examples of the device D include a traveling system actuator (motor generator, steering device, braking device, etc.), a body system device (lighting device, air conditioning device, wiper device, electric mirror, electric seat, electric door, etc.), a multimedia system device (navigation device, audio, meter, display, etc.), a detection system device (sensor, camera, radar, etc.), a communication device, and an electronic control unit (ECU) and the like.

In recent years, with the diversification of power supplies in the vehicle V, there is an increasing need to dispose and mount devices D with different drive voltages together in the vehicle V. Under such a circumstance, the power supply system Sys is required to appropriately supply power to a plurality of devices D with different drive voltages.

As described above, the wire harness WH of the present embodiment achieves, in a situation where the devices D with different drive voltages are mixed, a configuration in which power can be appropriately supplied to the various devices D mounted on the vehicle V. Hereinafter, each configuration of the wire harness WH and the like will be described in detail with reference to each drawing.

In the following description, it is assumed that the device D is a plurality of devices D with different drive voltages and includes a first device D1 driven at a first voltage V1 and a second device D2 driven at a second voltage V2. The first voltage V1 is, for example, a voltage of 30 V or more and 60 V or less. On the other hand, the second voltage V2 is lower than the first voltage V1, and is for example, higher than 0 V and lower than 30 V. Here, as an example, description will be given on the assumption that the first voltage V1 is "48 V" and the second voltage V2 is "12 V". That is, herein, description will be given on the assumption that the first device D1 is a 48 V drive device driven at a voltage of 48 V, and the second device D2 is a 12 V drive device driven at a voltage of 12 V. In the following description, in a case where it is not necessary to particularly distinguish between the first device D1 and the second device D2, they are sometimes simply referred to as the "device D".

Specifically, as illustrated in FIGS. 1 and 2, the power supply system Sys includes a high-voltage battery B1 and a 48 V battery B2 serving as power supplies, and a wire harness WH that electrically connects these batteries to the devices D. In FIG. 2, illustration of the high-voltage battery B1 is omitted for easy understanding of the drawing.

The high-voltage battery B1 is a battery that stores power at a predetermined high voltage, and is a first power supply capable of supplying power at the predetermined high voltage. The high-voltage battery B1 typically has a voltage higher than that of the 48 V battery B2 and has, for example, a voltage (battery voltage) of about 300 V to 400 V. The high-voltage battery B1 of the present embodiment is electrically connected to the 48 V battery B2 via a DC/DC converter B1A, and supplies power to the 48 V battery B2. The DC/DC converter B1A is a transformer that converts a voltage of DC power. The DC/DC converter B1A is electrically connected to the 48 V battery B2, converts a voltage of power from the high-voltage battery B1 into the first voltage V1, and outputs the first voltage V1 to the 48 V battery B2. Here, the first voltage V1 is "48 V". That is, the DC/DC converter B1A steps down the voltage of the high-voltage battery B1 to a voltage of 48 V corresponding to the first voltage V1, and outputs the resultant to the 48 V battery B2. The high-voltage battery B1 is electrically connected also to a device (not illustrated), and supplies power to the device (not illustrated).

The 48 V battery B2 is a battery that stores power at the first voltage V1 lower than the voltage of the high-voltage battery B1, and is a second power supply capable of supplying power at the first voltage V1. As described above, herein, the first voltage V1 is "48 V". That is, the 48 V battery B2 is a voltage (battery voltage) of about 48 V. The 48 V battery B2 is electrically connected to the high-voltage battery B1 via the DC/DC converter B1A, and can be charged with power supplied from the high-voltage battery B1 via the DC/DC converter B1A. The 48 V battery B2 is not limited to the high-voltage battery B1, and may be charged with power generated by, for example, a 48 V generator (48 V alternator) (not illustrated) or the like. The 48 V battery B2 is electrically connected to each device D via the wire harness WH, and supplies power to each device D via the wire harness WH. The 48 V battery B2 of the present embodiment serves as a power supply that supplies power to both the first device D1 and the second device D2 via the wire harness WH.

The wire harness WH constitutes a power supply system PL that supplies power from the 48 V battery B2, which is the power supply, to each device D. The wire harness WH of the present embodiment has a voltage conversion function of converting the voltage of the power supplied from the 48 V battery B2 into the second voltage V2, which is lower than the first voltage V1, to output the second voltage V2. Thereby, power is appropriately supplied to the first device D1 and the second device D2 with different drive voltages from each other.

Specifically, the wire harness WH of the present embodiment includes an electronic component unit 10, a power supply wire 20, a 48 V power supply distribution BOX 30, and a 12 V power supply distribution BOX 40. The electronic component unit 10 is equipped with the voltage conversion function.

The electronic component unit 10 is a unit directly connected to the 48 V battery B2 that is a power supply, and may be referred to as a battery fuse terminal (BFT). The electronic component unit 10 of the present embodiment further has the voltage conversion function for outputting 12 V in addition to a circuit branch function and a circuit protection function. The configuration enables the electronic component unit 10 to distribute power to the second device D2 that is the 12 V drive device in addition to distributing power to the first device D1 that is the 48 V drive device.

Figure 3:
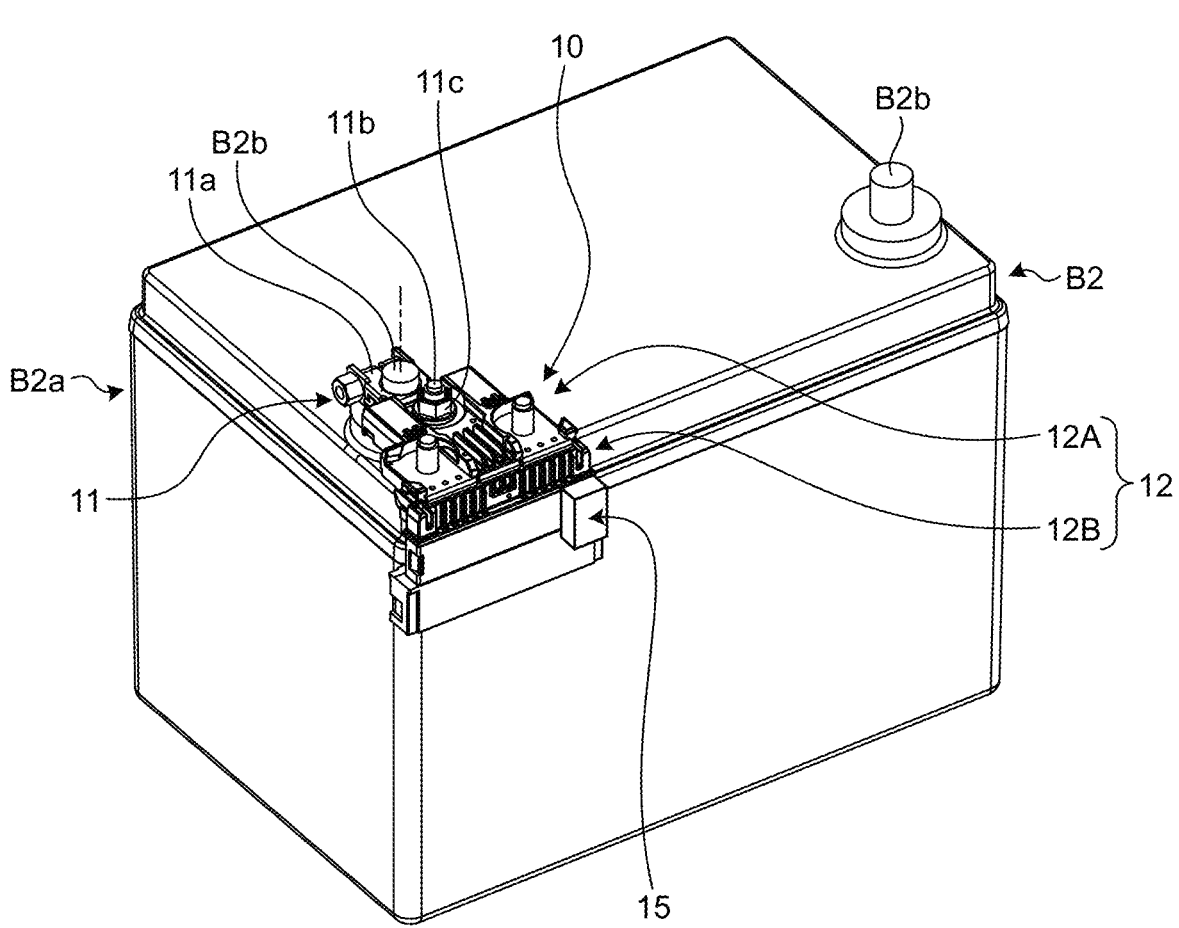
FIG. 3 is a perspective view illustrating a schematic configuration of a battery to which an electronic component unit according to the embodiment is assembled.
Figure 4:
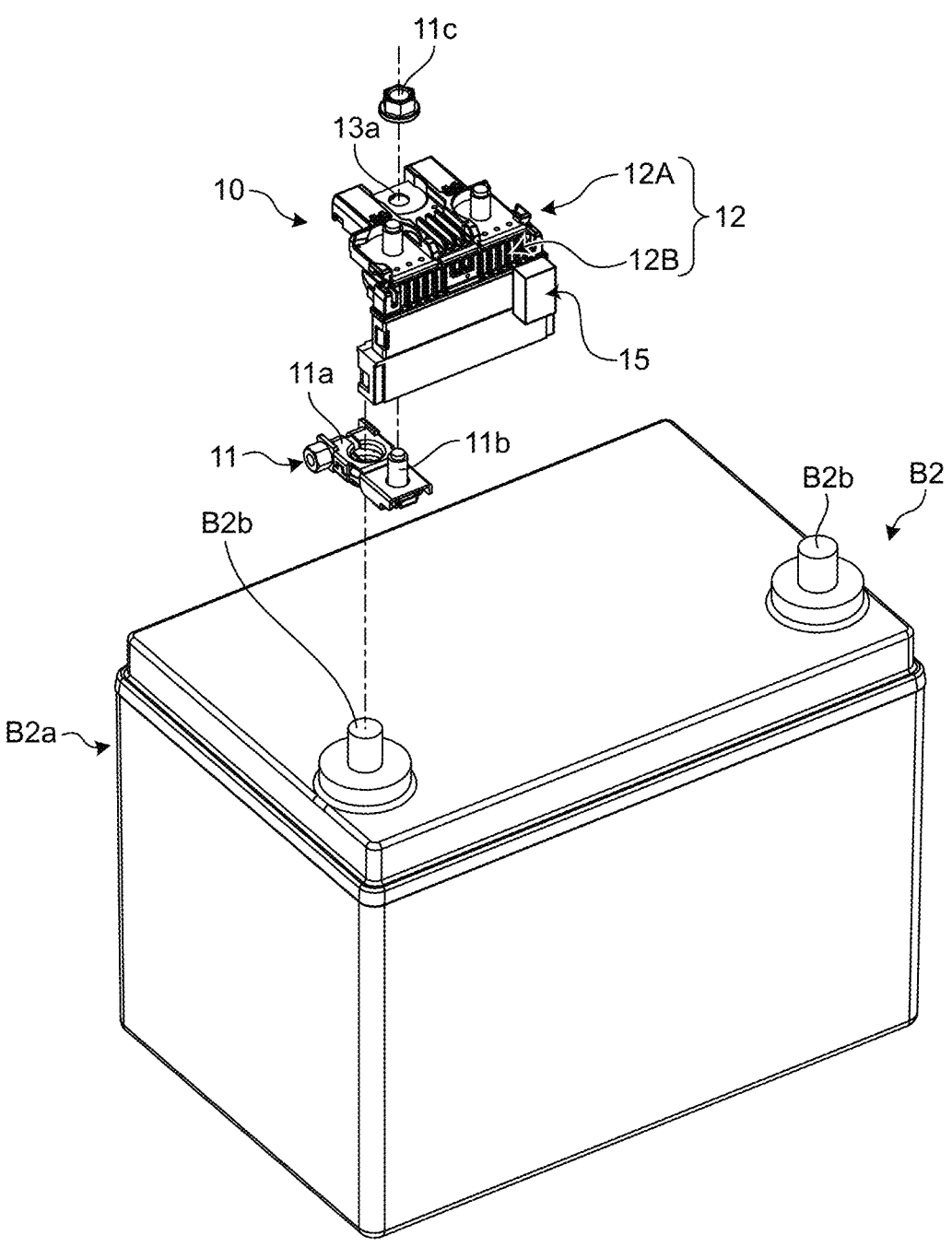
FIG. 4 is an exploded perspective view illustrating a schematic configuration of the electronic component unit according to the embodiment.
Figure 5:
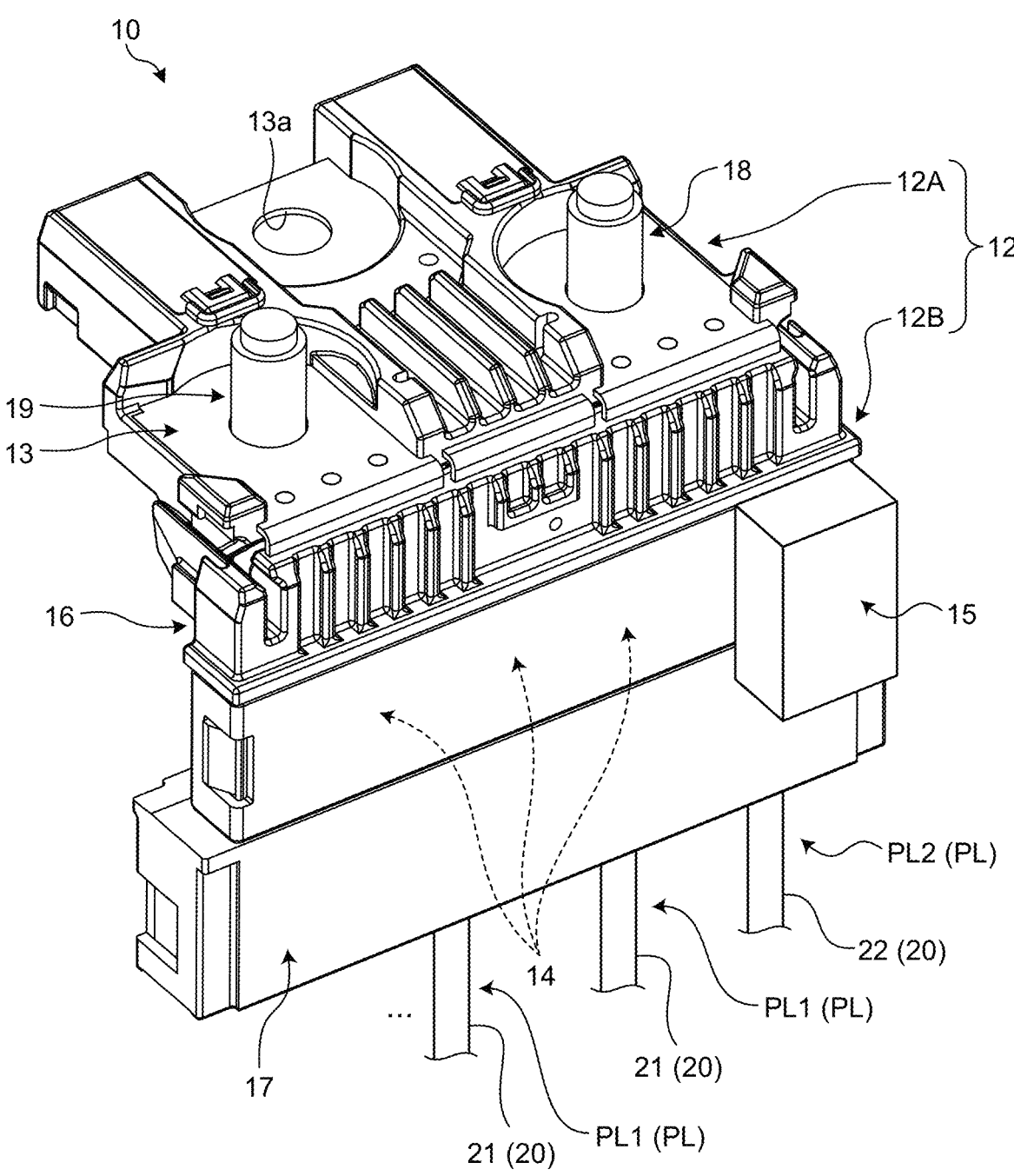
FIG. 5 is a perspective view illustrating a schematic configuration of the electronic component unit according to the embodiment.
Figure 6:
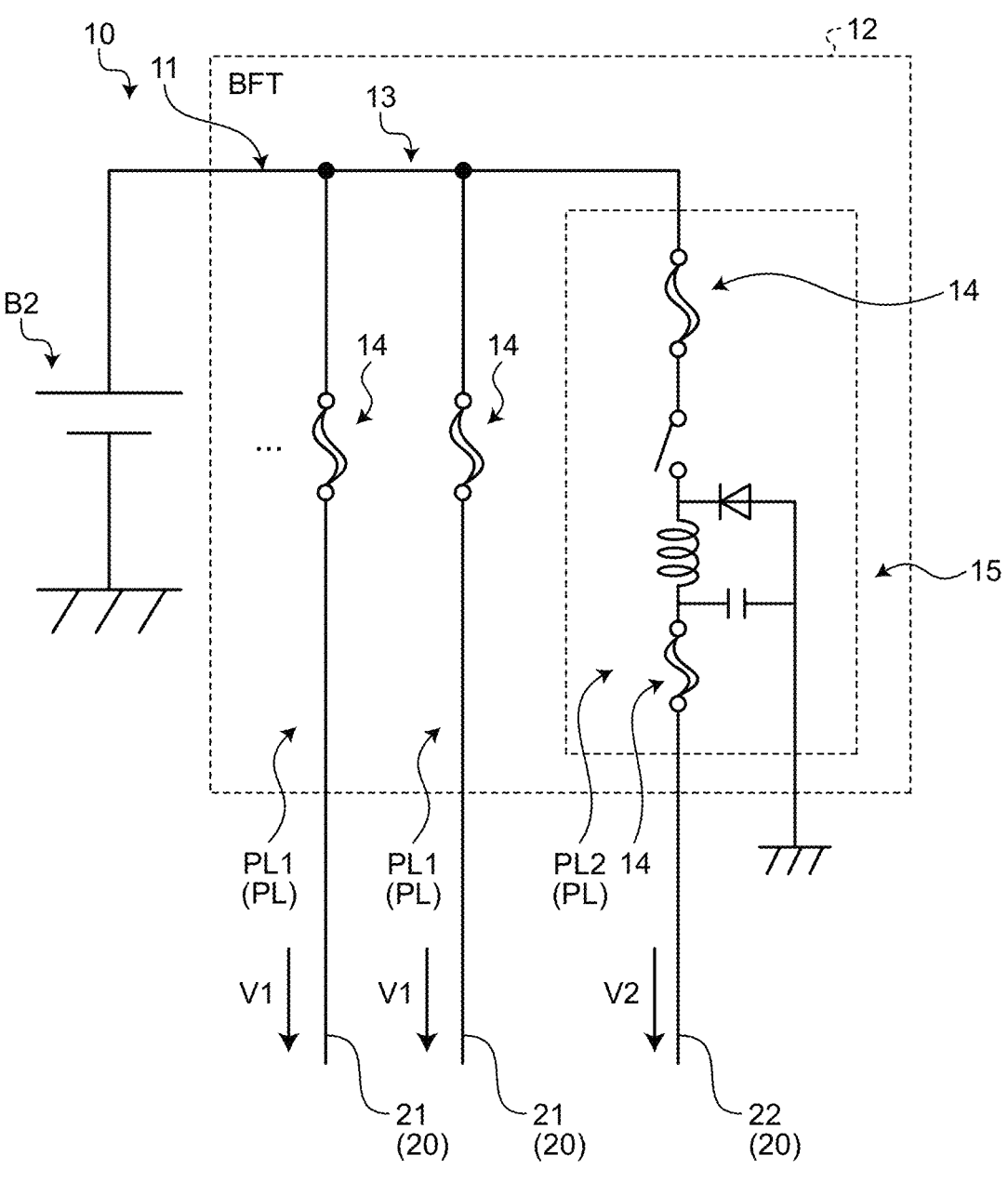
FIG. 6 is a schematic circuit diagram illustrating a schematic configuration of the electronic component unit according to the embodiment.

Here, as illustrated in FIGS. 3 and 4, the 48 V battery B2 provided with the electronic component unit 10 includes a battery housing B2a and a battery post B2b. The battery housing B2a is formed in a substantially rectangular parallelepiped shape as a whole, and houses battery liquid and various components therein. The battery post B2b is provided to protrude from the upper surface of the battery housing B2a. The battery post B2b is made of conductive lead or the like to have a substantially cylindrical shape. A pair of battery posts B2b is provided on the upper surface of the battery housing B2a at intervals, and one of the battery posts B2b constitutes an anode and the other constitutes a cathode. The electronic component unit 10 of the present embodiment is assembled to the battery post B2b on the anode side.

Specifically, as illustrated in FIGS. 3, 4, 5, and 6, the electronic component unit 10 includes a battery terminal 11 functioning as a power supply terminal and a unit body 12, and is electrically connected to the battery post B2*b* on the anode side via the battery terminal 11.

The battery terminal 11 is a connection terminal made of a conductive metal material. The battery terminal 11 is interposed between the battery post B2*b* and the unit body 12 to electrically connect them to each other. The battery terminal 11 includes a fastening portion 11*a*, a stud bolt 11*b*, and a nut 11*c*. In the battery terminal 11, the fastening portion 11*a* is fastened to the battery post B2*b*, and the unit body 12 is fastened to the stud bolt 11*b* via the nut 11*c*. As a result, the battery terminal 11 is electrically connected to the 48 V battery B2 and the unit body 12 to electrically connect them to each other.

The unit body 12 includes a base portion 12A and a hanging portion 12B. The base portion 12A and the hanging portion 12B intersect with each other via a bent portion, so that the unit body 12 is formed in a substantially L-shape as a whole. The base portion 12A is located on the upper surface of the battery housing B2*a* on which the battery post B2*b* is provided, and is located along that upper surface. The hanging portion 12B is provided to protrude so as to hang down along the side surface of the battery housing B2*a* from the base portion 12A via the bent portion.

The unit body 12 of the present embodiment includes a circuit branch portion 13 that implements the circuit branch function, a circuit protector 14 that implements the circuit protection function, and a voltage converter 15 that implements the voltage conversion function for outputting 12 V.

The circuit branch portion 13 is connected to the battery terminal 11 and is operable to branch the power supplied from the 48 V battery B2 into a plurality of power supply systems PL. Here, the plurality of power supply systems PL branched by the circuit branch portion 13 includes a plurality of 48 V power supply systems PL1 and at least one 12 V power supply system PL2. Each of the 48 V power supply systems PL1 is a power supply system PL that supplies a voltage of 48 V corresponding to the first voltage V1 to the first device D1 that is the 48 V drive device. On the other hand, the 12 V power supply system PL2 is a power supply system PL that supplies a voltage of 12 V corresponding to the second voltage V2 to the second device D2 that is the 12 V drive device. The circuit branch portion 13 branches the power supplied from the 48 V battery B2 into the plurality of 48 V power supply systems PL1 and at least one 12 V power supply system PL2.

The circuit branch portion 13 is configured with, for example, a metal bus bar. The metal bus bar is a plate-like conductor made of a conductive metal material. The circuit branch portion 13 is configured, with a metal bus bar, as a bus bar circuit having a branch portion. The circuit branch portion 13 is embedded and protected in a resin housing 16 (see FIG. 5) by, for example, insert molding or the like. The circuit branch portion 13 is formed by being bent across the base portion 12A and the hanging portion 12B via the bent portion.

In a state where the circuit branch portion 13 is embedded in the housing 16, a part of the circuit branch portion 13 located in the base portion 12A is partially exposed and a fastening hole 13*a* is formed in the exposed part. The stud bolt 11*b* described above is inserted through the fastening hole 13*a* to be screwed into the nut 11*c*, so that the circuit branch portion 13 is fastened to the battery terminal 11, electrically connected to the battery terminal 11, and electrical contact can be made. As a result, the circuit branch portion 13 is conducted to the 48 V battery B2 via the battery terminal 11, and power is supplied and input from the 48 V battery B2 at the first voltage V1, that is, at a voltage of 48 V.

The circuit branch portion 13 constitutes a circuit branched according to the number of power supply systems PL, and branches the power supplied from the 48 V battery B2 into the plurality of power supply systems PL. In the circuit branch portion 13, in an output terminal portion 17 (see FIG. 5) located at an end of the hanging portion 12B of the unit body 12, an end of the branched circuit is electrically connected to each power supply wire 20 that constitutes each power supply system PL via a connector or the like, and the branched power is output to each of the power supply wires 20.

For example, stud bolts 18 and 19 and so on are also articulated with the circuit branch portion 13, and the circuit branch portion 13 is embedded and integrated in the housing 16 together with the stud bolts 18 and 19. In the stud bolts 18 and 19, for example, a connection terminal and the like are fastened together with the circuit branch portion 13, and the 48 V generator (48 V alternator) described above, other devices, and the like are electrically connected via the connection terminal and the like.

The circuit protector 14 is provided in the power supply system PL in the circuit branch portion 13. When overcurrent flows through the power supply system PL, the circuit protector 14 cuts off the overcurrent to protect the power supply system PL. Here, the circuit protector 14 is provided for each of the plurality of power supply systems PL in the circuit branch portion 13. Typically, the circuit protector 14 is configured with a fuse element such as a fuse or a fusible link that is fused to cut off a current path when overcurrent flows. The circuit protector 14 is incorporated in a circuit constituting each power supply system PL in the circuit branch portion 13. The overcurrent herein is, for example, current equal to or higher than a preset rating. That is, the fuse element is fused when current equal to or higher than the preset rating flows. The rated current is determined according to the current of the circuit to be protected. Typically, the fuse elements constituting the circuit protector 14 have different capacities in the 48 V power supply system PL1 and the 12 V power supply system PL2. Note that the circuit protector 14 is not limited to the fuse element, and for example, a protective circuit breaker including a semiconductor relay or the like may be applied.

The voltage converter 15 is provided in at least one of the plurality of power supply systems PL in the circuit branch portion 13. The voltage converter 15 converts a voltage of the power supplied from the 48 V battery B2 into the second voltage V2 lower than the first voltage V1 to output the second voltage V2. As a result, the electronic component unit 10 of the present embodiment can also output at the second voltage V2 lower than the first voltage V1 in addition to the output at the first voltage V1 corresponding to the battery voltage of the 48 V battery B2. The voltage converter 15 is provided in the 12 V power supply system PL2 of the plurality of power supply systems PL in the circuit branch portion 13. The voltage converter 15 performs step-down voltage conversion on a voltage of 48 V corresponding to the first voltage V1 into a voltage of 12 V corresponding to the second voltage V2 to output the voltage of 12 V to the 12 V power supply system PL2.

Figure 7:
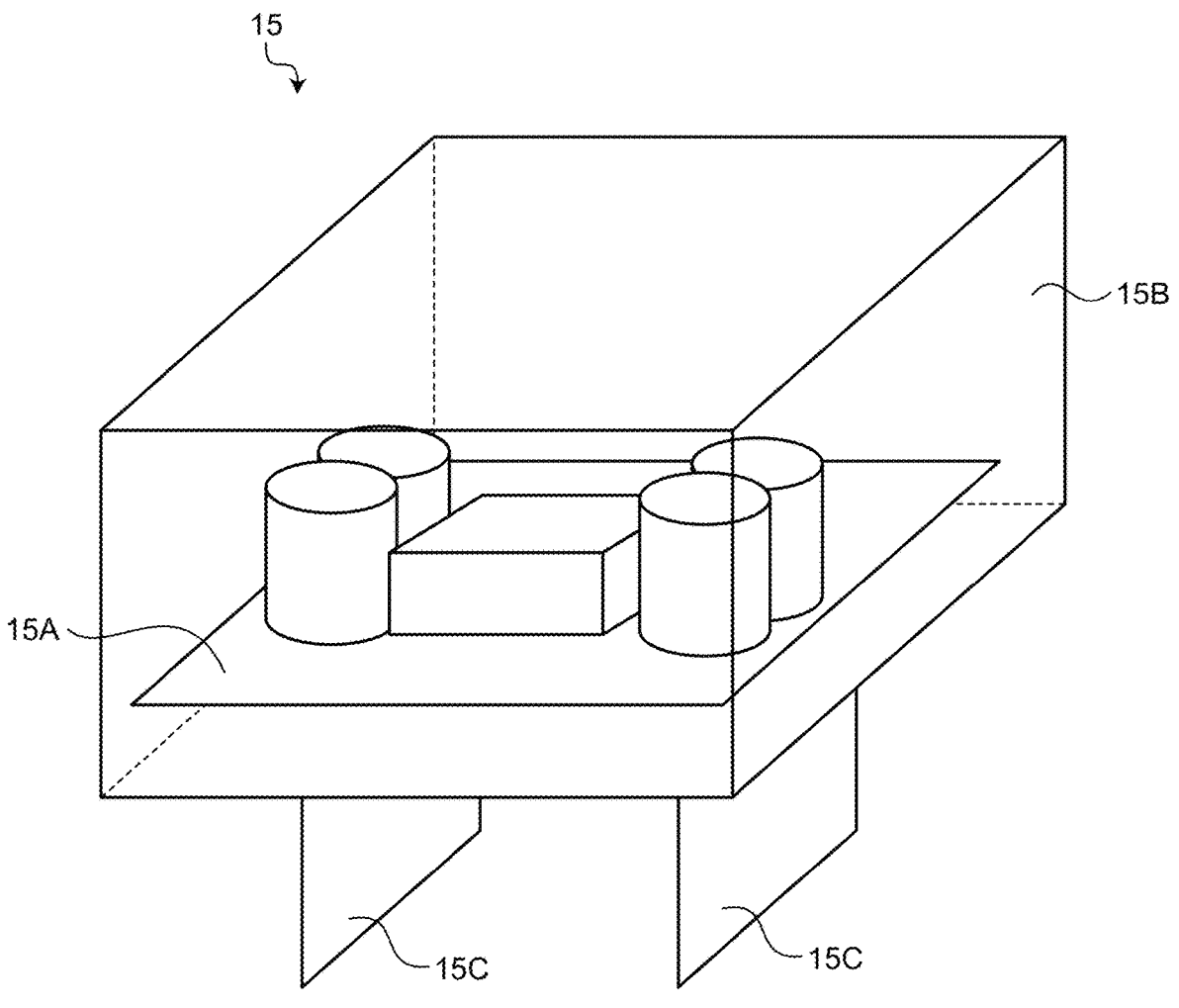
FIG. 7 is a schematic perspective view illustrating a schematic configuration of a voltage converter of the electronic component unit according to the embodiment.

The voltage converter 15 is typically configured with a DC/DC converter that converts a voltage of DC power. For example, the voltage converter 15 may be configured to be directly incorporated into a portion constituting the 12 V power supply system PL2 in the circuit branch portion 13 by soldering or the like. In addition, for example, as illustrated in FIG. 7, the voltage converter 15 may be configured to be detachable from the 12 V power supply system PL2 in the circuit branch portion 13 by accommodating a converter body 15A in which the electronic components are mounted on the substrate in a housing 15B and modularizing a configuration in which a connection terminal 15C protrudes from the housing 15B. In this case, the voltage converter 15 is detachably assembled to the circuit branch portion 13 by inserting the connection terminal 15C into a portion constituting the 12 V power supply system PL2 in the circuit branch portion 13. Note that, in the 12 V power supply system PL2, the circuit protector 14 descried above may be disposed on the upstream side of the voltage converter 15 (48 V battery B2 side) and configured to be integrated with the voltage converter 15, or, alternatively, may be disposed on the downstream side of the voltage converter 15 (second device D2 side) and configured to be integrated with the voltage converter 15.

The electronic component unit 10 configured as described above outputs a part of the power input from the 48 V battery B2 to the circuit branch portion 13 via the battery terminal 11 to each 48 V power supply system PL1 at the first voltage V1 corresponding to the battery voltage without transforming the part of the power, and steps down the remaining part of the power to the second voltage V2 by the voltage converter 15 to output the second voltage V2 to the 12 V power supply system PL2. As a result, the electronic component unit 10 outputs power at a voltage of 48 V corresponding to the first voltage V1 to the first device D1 that is the 48 V drive device, and outputs power at a voltage of 12 V corresponding to the second voltage V2 to the second device D2 that is the 12 V drive device. In this case, the electronic component unit 10 protects each power supply system PL by interposing the circuit protector 14 in each power supply system PL in the circuit branch portion 13.

As illustrated in FIGS. 1, 2, 5, and 6, the power supply wire 20 is a wiring member that is interposed between the electronic component unit 10 and the device D to supply power from the electronic component unit 10 to the device D. That is, the power supply wire 20 constitutes the power supply system PL that supplies power to the device D. The power supply wire 20 is typically configured with a general electric wire, but may be configured with, for example, a planar circuit body such as a flexible printed circuit (FPC) or a flexible flat cable (FFC). The power supply wire 20 of the present embodiment includes a first power supply wire 21 and a second power supply wire 22.

The first power supply wire 21 is the power supply wire 20 constituting the 48 V power supply system PL1 of the power supply system PL. The first power supply wire 21 is provided across the output terminal portion 17 of the electronic component unit 10 and each first device D1, and the 48 V power supply distribution BOX 30 to be described later is provided on the first power supply wire 21. The first power supply wire 21 supplies power output from the electronic component unit 10 at a voltage of 48 V corresponding to the first voltage V1 without passing through the voltage converter 15 to the first device D1 that is the 48 V drive device.

The second power supply wire 22 is the power supply wire 20 constituting the 12 V power supply system PL2 of the power supply system PL. The second power supply wire 22 is provided across the output terminal portion 17 of the electronic component unit 10 and each second device D2, and the 12 V power supply distribution BOX 40 to be described later is provided on the second power supply wire 22. The second power supply wire 22 supplies power output from the electronic component unit 10 via the voltage converter 15 at a voltage of 12 V corresponding to the second voltage V2 to the second device D2 that is the 12 V drive device.

In each of the power supply wires 20 configured as described above, for example, in a transition period in which the first device D1 that is the 48 V drive device and the second device D2 that is the 12 V drive device are mixed in the vehicle V, typically, the first power supply wire 21 constituting the 48 V power supply system PL1 having a relatively high voltage tends to be configured to be relatively thin, and the second power supply wire 22 constituting the 12 V power supply system PL2 having a relatively low voltage tends to be configured to be relatively thick. However, the power supply wires 20 are not limited thereto.

As illustrated in FIGS. 1 and 2, the 48 V power supply distribution BOX 30 is interposed between the electronic component unit 10 and the first device D1, and distributes the power supplied from the 48 V battery B2 to the plurality of first devices D1. The 48 V power supply distribution BOX 30 includes electronic components such as a branch portion, a fuse (circuit protector), and a relay, and distributes power to the plurality of first devices D1 in cooperation of these electronic components. The 48 V power supply distribution BOX 30 is provided on the first power supply wire 21 constituting the 48 V power supply system PL1 of the power supply system PL. The 48 V power supply distribution BOX 30 distributes power output at a voltage of 48 V corresponding to the first voltage V1 without being stepped down in the electronic component unit 10 to the plurality of first devices D1 that are the 48 V drive devices. The first power supply wire 21 branches, on the output side of the 48 V power supply distribution BOX 30, into the number corresponding to the number of first devices D1 to which power is distributed from the 48 V power supply distribution BOX 30. In the example of FIG. 2, a total of three 48 V power supply distribution BOXES 30 are illustrated.

As illustrated in FIGS. 1 and 2, the 12 V power supply distribution BOX 40 is interposed between the electronic component unit 10 and the second device D2, and distributes the power supplied from the 48 V battery B2 to the plurality of second devices D2. As with the 48 V power supply distribution BOX 30, the 12 V power supply distribution BOX 40 includes electronic components such as a branch portion, a fuse (circuit protector), and a relay, and distributes power to the plurality of second devices D2 in cooperation of these electronic components. The 12 V power supply distribution BOX 40 is provided on the second power supply wire 22 constituting the 12 V power supply system PL2 of the power supply system PL. The 12 V power supply distribution BOX 40 distributes power stepped down by the voltage converter 15 in the electronic component unit 10 and output at a voltage of 12 V corresponding to the second voltage V2 to the plurality of second devices D2 that are the 12 V drive devices. The second power supply wire 22 branches, on the output side of the 12 V power supply distribution BOX 40, into the number corresponding to the number of second devices D2 to which power is distributed from the 12 V power supply distribution BOX 40. In the example of FIG. 2, a total of one 12 V power supply distribution BOX 40 is illustrated.

The wire harness WH and the electronic component unit 10 described above can output, in the electronic component unit 10, a part of the power input from the 48 V battery B2 to the circuit branch portion 13 via the battery terminal 11 without being transformed to each of the 48 V power supply systems PL1 at the first voltage V1 corresponding to the battery voltage. On the other hand, the wire harness WH and the electronic component unit 10 can step down, in the electronic component unit 10, the remaining part of the power input from the 48 V battery B2 to the circuit branch portion 13 via the battery terminal 11 to the second voltage V2 by the voltage converter 15 and output the second voltage V2 to the 12 V power supply system PL2. As a result, the electronic component unit 10 can output power at a voltage of 48 V corresponding to the first voltage V1 to the first device D1 that is the 48 V drive device, and output power at a voltage of 12 V corresponding to the second voltage V2 lower than the first voltage V1 to the second device D2 that is the 12 V drive device. As a result, the wire harness WH and the electronic component unit 10 can appropriately distribute and supply power to the first device D1 and the second device D2 with different drive voltages from each other.

In this case, the wire harness WH is disposed such that the electronic component unit 10 having the voltage conversion function of transforming from the first voltage V1 corresponding to the battery voltage of the 48 V battery B2 to the second voltage V2 and outputting the second voltage V2 is directly provided on the 48 V battery B2. With this arrangement, in the wire harness WH and the electronic component unit 10, for example, in a case where the second devices D2 driven at the second voltage V2 are densely disposed in the vicinity of the 48 V battery B2, the routing length of the second power supply wire 22 whose wire diameter is relatively large and whose weight tends to be large can be shortened as much as possible to enhance the routing efficiency. This prevents the weight of the entire wire harness WH from being increased.

As described above, the wire harness WH and the electronic component unit 10 can appropriately supply power to the various devices D mounted on the vehicle V even in a situation where the devices D with different drive voltages are mixed.

Further, in the wire harness WH and the electronic component unit 10 described above, the circuit protector 14 is interposed in each power supply system PL in the circuit branch portion 13 of the electronic component unit 10. Thus, when overcurrent flows through the power supply system PL, the circuit protector 14 cuts off the overcurrent, so that the power supply system PL can be protected.

Further, in the wire harness WH and the electronic component unit 10 described above, the voltage converter 15 can be configured to be detachable from the power supply system PL in the circuit branch portion 13. In this case, in the wire harness WH and the electronic component unit 10, for example, the voltage converter 15 can be appropriately changed and added according to necessary performance in a case where a new device D is additionally mounted during use while the vehicle V tends to be used for a long period of time to achieve carbon neutral or the like. As a result, in the wire harness WH and the electronic component unit 10, for example, the voltage converter 15 is selected according to addition or update of the device D mounted on the vehicle V and assembled to the electronic component unit 10, so that it is possible to easily achieve necessary voltage output and capacity without replacing the entire electronic component unit 10 with another one, for example. In the wire harness WH and the electronic component unit 10, the number of outputs of the second voltage V2 lower than the first voltage V1, which is a battery voltage, can be optionally increased according to the situation by providing, in each power supply system PL, a structure that the voltage converter 15 is detachable, for example, in the circuit branch portion 13.

Note that the electronic component unit and the wire harness according to the embodiment of the present invention described above are not limited to the embodiment described above, and various modifications can be made thereto within the scope described in the claims.

In the above description, the electronic component unit 10 has the circuit protection function together with the circuit branch function and the voltage conversion function, but the present invention is not limited thereto. Specifically, it is possible that the electronic component unit 10 does not include the circuit protector 14 and, for example, the circuit protector may be provided in another part on each power supply system PL.

In the above description, the circuit branch portion 13 branches the power supplied from the 48 V battery B2 into the plurality of 48 V power supply systems PL1 and one 12 V power supply system PL2, but the present invention is not limited thereto. Two or more 12 V power supply systems PL2 may be provided. In this case, in the electronic component unit 10, the voltage converter 15 is provided in each 12 V power supply system PL2 in the circuit branch portion 13.

In the above description, the power supply terminal 11 and the unit body 12 are configured separately, but the present invention is not limited thereto. The power supply terminal 11 and the unit body 12 may be integrally configured, and for example, the power supply terminal 11 and the circuit branch portion 13 may be integrally connected.

The electronic component unit and the wire harness according to the present embodiment may be configured by appropriately combining the constituent elements of the embodiment and the modifications described above.

Reference Example

Figure 8:
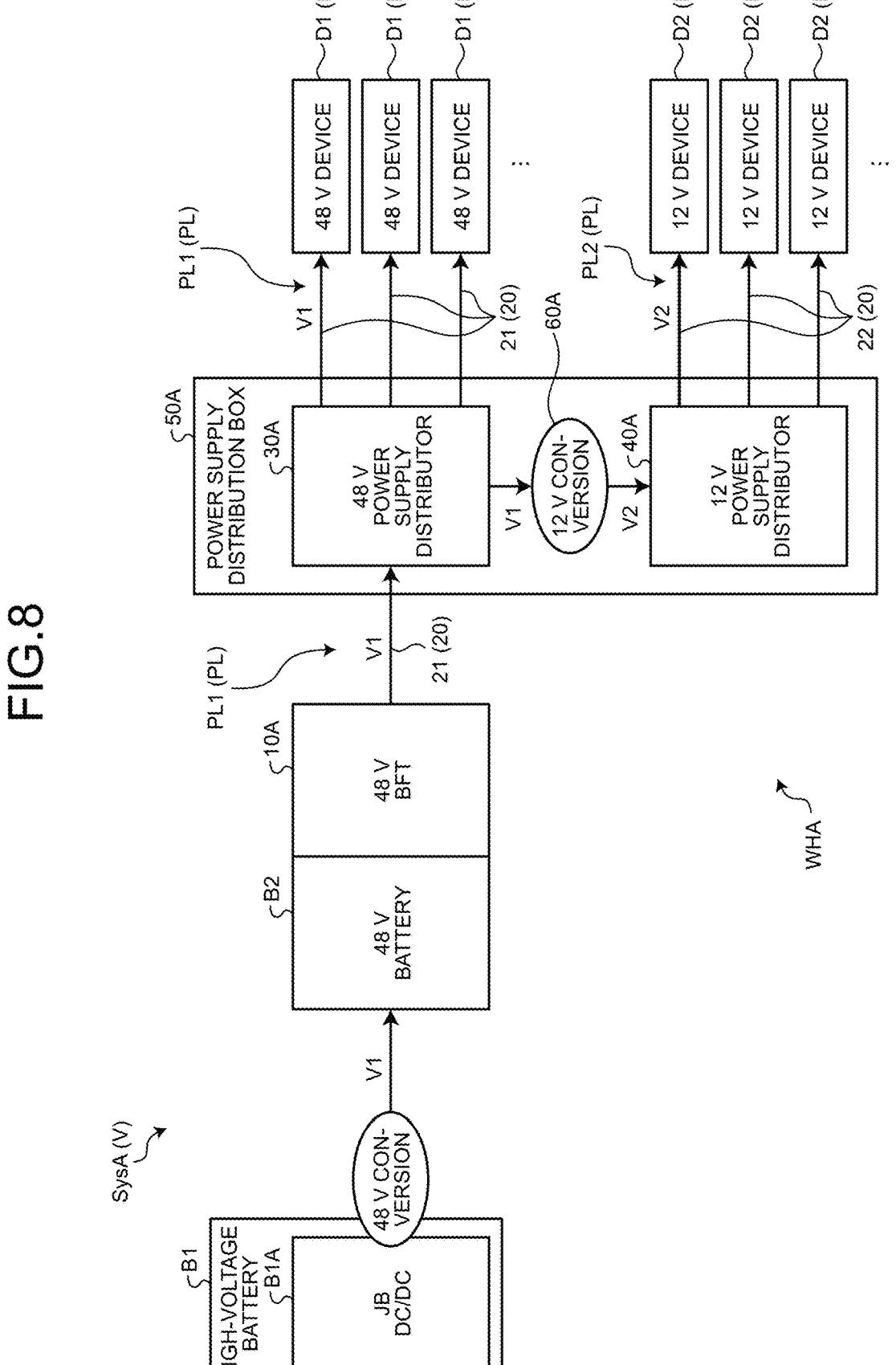
FIG. 8 is a schematic block diagram illustrating a schematic configuration of a power supply system to which a wire harness according to a reference example is applied.
Figure 9:
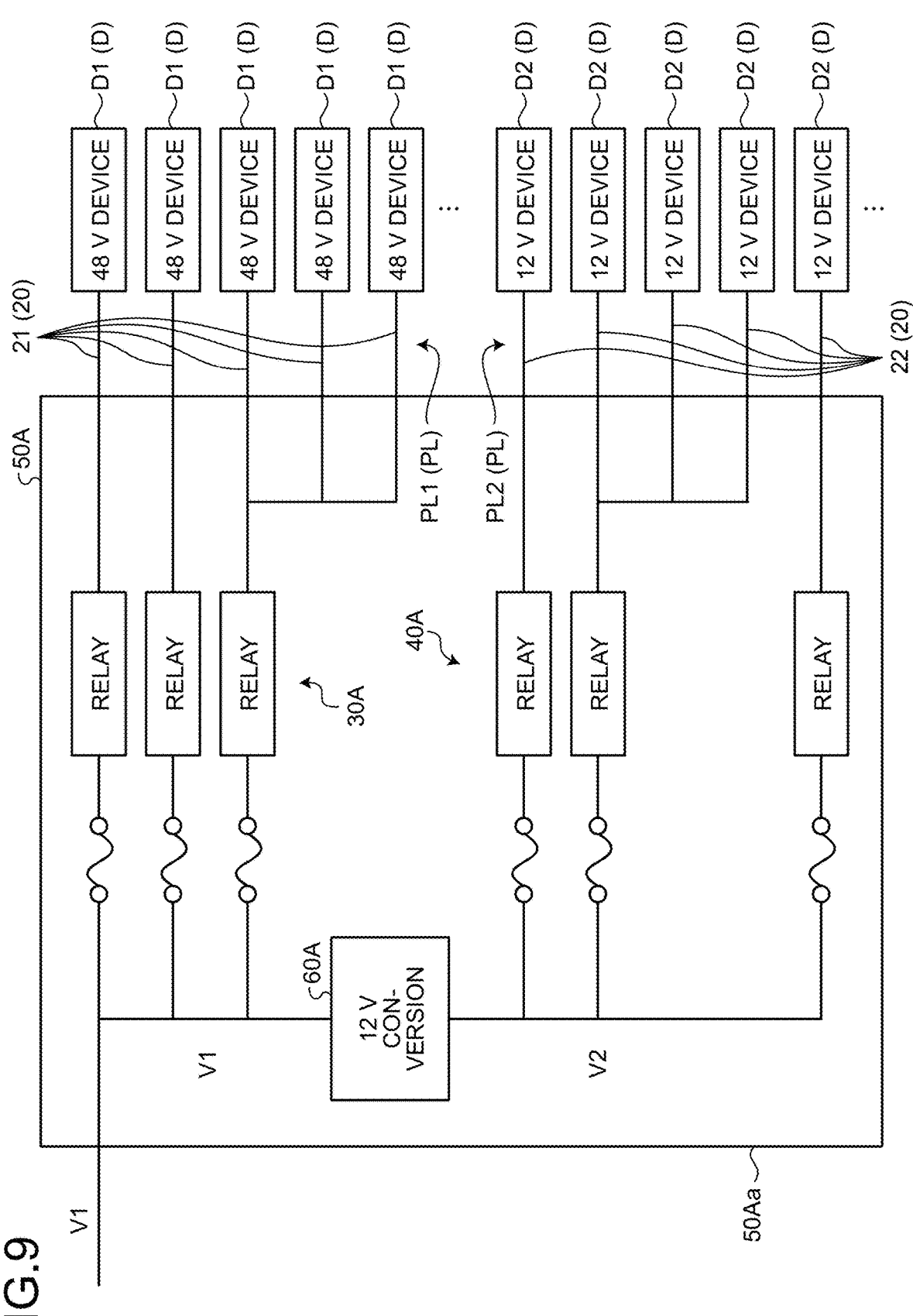
FIG. 9 is a schematic circuit diagram illustrating a schematic configuration of the power supply system to which the wire harness according to the reference example is applied.

FIGS. 8 and 9 illustrate a schematic configuration of a power supply system SysA to which a wire harness WHA according to a reference example is applied. The wire harness WHA according to the reference example is different from the wire harness WH described above in that the wire harness WHA includes an electronic component unit 10A instead of the electronic component unit 10 and includes a power supply distribution BOX 50A instead of the 48 V power supply distribution BOX 30 and the 12 V power supply distribution BOX 40. Further, the electronic component unit 10A according to the reference example is different from the electronic component unit 10 described above in that the electronic component unit 10A does not have the voltage converter 15 implementing the voltage conversion function. The other configurations of the wire harness WHA and the electronic component unit 10A are substantially similar to those of the wire harness WH and the electronic component unit 10.

The power supply distribution BOX 50A according to the reference example includes a 48 V power supply distributor 30A, a 12 V power supply distributor 40A, and a voltage converter 60A, which are unitized in one housing (BOX) 50Aa. Thereby, the voltage conversion function for outputting 12 V corresponding to the second voltage V2 is implemented.

The 48 V power supply distributor 30A is interposed between the electronic component unit 10A and the first device D1, and distributes the power supplied from the 48 V battery B2 to the plurality of first devices D1. As with the 48 V power supply distribution BOX 30, the 48 V power supply distributor 30A includes electronic components such as a branch portion, a fuse (circuit protector), and a relay, and distributes power to the plurality of first devices D1 in cooperation of these electronic components. The 48 V power supply distributor 30A is provided on the first power supply wire 21 constituting the 48 V power supply system PL1 of the power supply system PL. The 48 V power supply distributor 30A distributes power output at a voltage of 48 V corresponding to the first voltage V1 without being stepped down in the electronic component unit 10A to the plurality of first devices D1 that are the 48 V drive devices. The first power supply wire 21 branches, on the output side of the 48 V power supply distributor 30A, into the number corresponding to the number of first devices D1 to which power is distributed from the 48 V power supply distributor 30A.

The voltage converter 60A converts the voltage of the power branched and supplied from the 48 V power supply distributor 30A into the second voltage V2 lower than the first voltage V1 to output the second voltage V2, and outputs the second voltage V2 to the 12 V power supply distributor 40A. As a result, the power supply distribution BOX 50A of the reference example can also output at the second voltage V2 lower than the first voltage V1 in addition to the output at the first voltage V1 corresponding to the battery voltage of the 48 V battery B2. The voltage converter 60A is interposed between the 48 V power supply distributor 30A and the 12 V power supply distributor 40A in the circuit in the power supply distribution BOX 50A. The voltage converter 60A performs step-down voltage conversion on a voltage of 48 V corresponding to the first voltage V1 into a voltage of 12 V corresponding to the second voltage V2 to output the voltage of 12 V to the 12 V power supply distributor 40A. As with the voltage converter 15, the voltage converter 60A is typically configured with a DC/DC converter that converts a voltage of DC power.

The 12 V power supply distributor 40A is interposed between the electronic component unit 10A and the second device D2, and distributes the power supplied from the 48 V battery B2 to the plurality of second devices D2. As with the 12 V power supply distribution BOX 40, the 12 V power supply distributor 40A includes electronic components such as a branch portion, a fuse (circuit protector), and a relay, and distributes power to the plurality of second devices D2 in cooperation of these electronic components. The 12 V power supply distributor 40A of the reference example distributes power stepped down by the voltage converter 60A in the power supply distribution BOX 50A and output at a voltage of 12 V corresponding to the second voltage V2 to the plurality of second devices D2 that are the 12 V drive devices. In the reference example, a portion of the power supply system PL closer to the second device D2 side than the 12 V power supply distributor 40A constitutes the 12 V power supply system PL2. The second power supply wire 22 branches, on the output side of the 12 V power supply distributor 40A, into the number corresponding to the number of second devices D2 to which power is distributed from the 12 V power supply distributor 40A.

As to the wire harness WHA and the power supply system SysA according to the reference example described above, in the power supply distribution BOX 50A, the 48 V power supply distributor 30A that distributes power supply of a voltage of 48 V corresponding to the first voltage V1, the voltage converter 60A that performs voltage conversion from the first voltage V1 to the second voltage V2, and the 12 V power supply distributor 40A that distributes power supply of a voltage of 12 V corresponding to the second voltage V2 can be unitized in one housing 50Aa. With this configuration, the wire harness WHA and the power supply system SysA according to the reference example can appropriately supply power to the various devices D mounted on the vehicle V while preventing an increase in types of metal molds required to mold various casings used in the wire harness WHA, for example.

The power supply distribution BOX 50A may include a zone ECU and the like in the vehicle V together with the 48 V power supply distributor 30A, the 12 V power supply distributor 40A, the voltage converter 60A, and the like.

As described above, in the wire harness WH and the electronic component unit 10, the voltage converter 15 can be appropriately changed and added according to necessary performance, for example, in a case where a new device D is additionally mounted while the wire harness WH and the electronic component unit 10 are used. In this regard, as a reference example, the wire harness and the electronic component unit may have a configuration in which the voltage converter is removed, for example, in a case where the voltage converter 15 becomes unnecessary afterwards.

The electronic component unit and the wire harness according to the present embodiment exhibit advantageous effects of appropriately supplying power to various devices mounted on a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component unit comprising:

a power supply terminal connected to a power supply that is mounted on a vehicle and is capable of supplying power at a first voltage;

a housing that includes a first portion configured to be located on a first surface of the power supply and a second portion configured to extend along a second surface of the power supply that is different from the first surface;

a circuit branch portion that includes a first portion contained inside the housing and a second portion that is exposed outside of the housing and connected to the power supply terminal to branch power supplied from the power supply into a plurality of power supply systems; and a voltage converter that is provided in at least one of the plurality of power supply systems in the circuit branch portion, and converts a voltage of the power supplied from the power supply into a second voltage lower than the first voltage to output the second voltage.

2. The electronic component unit according to claim 1, further comprising:

a circuit protector that is provided in the power supply system in the circuit branch portion and protects, in response to overcurrent flowing through the power supply system, the power supply system by cutting off the overcurrent.

3. A wire harness comprising:

a first distribution box;

a second distribution box;

an electronic component unit provided in a power supply that is mounted on a vehicle and is capable of supplying power at a first voltage to each of the first distribution box and the second distribution box;

a first power supply wire that supplies power at the first voltage from the first distribution box to a first device mounted on the vehicle, wherein the electronic component unit includes:

a power supply terminal connected to the power supply, a circuit branch portion that is connected to the power supply terminal to branch power supplied from the power supply into a plurality of power supply systems, and a voltage converter that is provided in at least one of the plurality of power supply systems in the circuit branch portion, and converts a voltage of the power supplied from the power supply into the second voltage lower than the first voltage to output the second voltage, and the plurality of power systems includes a second power supply wire that supplies power at the second voltage from the second distribution box to a second device mounted on the vehicle.

4. The wire harness according to claim 3, wherein the electronic component further includes a housing that includes a first portion configured to be located on a first surface of the power supply and a second portion configured to extend along a second surface of the power supply that is different from the first surface.

* * * * *